United States Patent [19]

Duchesneau

[11] Patent Number: 4,533,295
[45] Date of Patent: Aug. 6, 1985

[54] PITCH CONTROL SYSTEM FOR VARIABLE PITCH PROPELLER

[75] Inventor: Jerome G. Duchesneau, Andover, Conn.

[73] Assignee: United Technologies Corporation, Hartford, Conn.

[21] Appl. No.: 451,637

[22] Filed: Dec. 20, 1982

[51] Int. Cl.³ .............................................. B64C 11/40
[52] U.S. Cl. ........................................ 416/27; 416/49; 416/157 R; 416/50
[58] Field of Search ................. 416/49, 50, 157 R, 27

[56] References Cited

U.S. PATENT DOCUMENTS

| | | | |
|---|---|---|---|
| 2,337,613 | 12/1943 | Martin | 170/163 |
| 2,378,938 | 6/1945 | McCoy | 170/163 |
| 2,388,276 | 11/1945 | McCoy | 170/163 |
| 2,423,191 | 7/1947 | Kopp | 416/50 X |
| 2,426,007 | 8/1947 | Forsyth | 170/163 |
| 2,636,566 | 4/1953 | Jedrziewski | 179/160.2 |
| 2,640,555 | 6/1953 | Cushman | 170/160.21 |
| 2,738,022 | 3/1956 | Zwack | 170/160.19 |
| 2,808,891 | 10/1957 | Stuart | 416/50 X |
| 2,910,126 | 10/1959 | Jedrziewski | 416/157 R |
| 2,913,056 | 11/1959 | Farkas | 170/135.74 |
| 2,923,361 | 2/1960 | Best | 170/135.29 |
| 2,934,154 | 4/1960 | Chilman | 170/160.32 |
| 2,943,686 | 7/1960 | Luiz et al. | 416/50 |
| 3,001,588 | 9/1961 | Fischer | 170/160.14 |
| 3,024,848 | 3/1962 | Chilman et al. | 170/160.32 |
| 3,068,943 | 12/1962 | Fischer | 416/50 |
| 3,115,938 | 12/1963 | Fischer et al. | 416/48 |
| 3,170,521 | 2/1965 | Gaubis et al. | 170/160.29 |
| 3,212,586 | 10/1965 | Barnes et al. | 416/157 R |
| 3,387,663 | 6/1968 | Barnes et al. | 416/50 X |
| 3,389,641 | 6/1968 | Barnes | 416/157 R |
| 3,589,830 | 6/1971 | Mogren et al. | 416/1 |
| 3,802,799 | 4/1974 | McMurtry | 416/157 R |
| 4,260,329 | 4/1981 | Bjorknas | 416/49 X |

Primary Examiner—Everette A. Powell, Jr.
Attorney, Agent, or Firm—John Swiatocha

[57] ABSTRACT

A pitch control system (10) for a variable pitch propeller effects engine governor (330), control of blade pitch under normal operating conditions and automatically effects direct (beta) control of blade pitch by the power lever (305) throughout a predetermined range of power lever settings. The system is hydromechanical and comprises a pitch actuator (40) and a pair of control valves (120 and 210), a first of the valves (120) applying a metered fluid pressure from a governor controlled pilot valve to the actuator and blocking that signal and replacing it with a supply fluid pressure at the point of transition from governor to beta control. The second control valve (210) effects a controlled draining of the actuator and connection thereof with the power lever (305).

12 Claims, 1 Drawing Figure

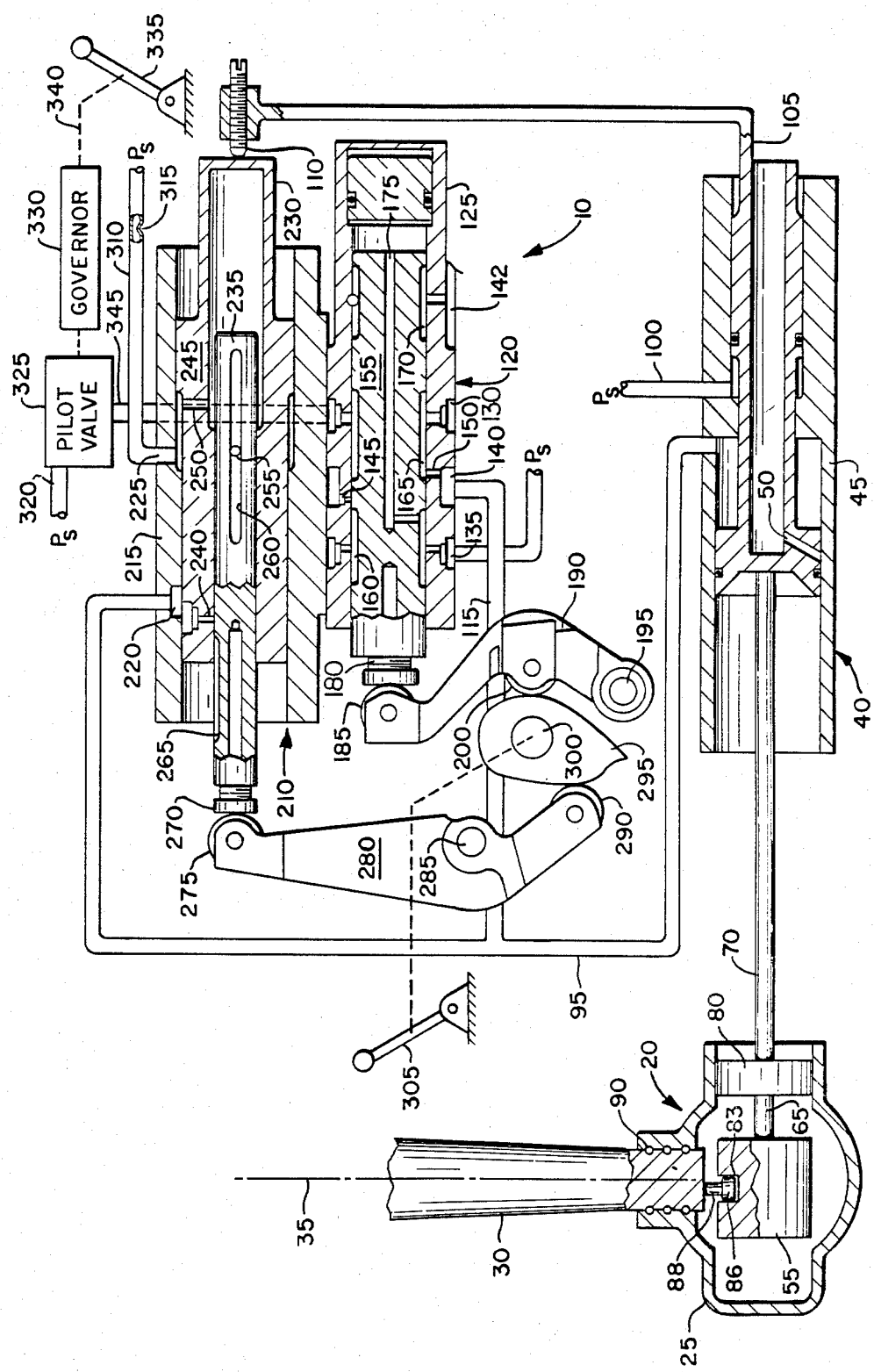

PITCH CONTROL SYSTEM FOR VARIABLE PITCH PROPELLER

DESCRIPTION

1. Technical Field

This invention relates generally to a pitch control system for a variable pitch propeller and more particularly to such a system wherein propeller pitch is automatically set in response to engine speed governor settings as well as engine power lever settings.

2. Background Art

It has long been known to control the operation of propeller driven aircraft (particularly the speed of the aircraft engine) by varying the pitch of the individual blades of the aircraft propeller(s). Typically, to control engine speed while the aircraft is in flight, the pilot sets a condition lever which adjusts the setting of an engine speed governor which in turn actuates a pitch actuator to adjust propeller blade pitch independently of engine output power. Such adjustments to blade pitch effect corresponding adjustments in the "bite" of the propeller blades to thereby control engine speed.

The output power of the aircraft engine is controlled by an engine power lever or a "joystick" which, like the condition lever, is adjusted by the pilot. It has been the practice to control propeller blade pitch by an adjustment of the power lever independently of the engine speed governor when the aircraft is in a taxi mode of operation. Such direct power lever control of blade pitch is commonly known as beta control and has in the past been effected by the pilot's activation of a control which locks out the governor when beta control is desired. However, in modern turbo-prop commuter aircraft, there is a requirement that propeller blade pitch control automatically convert from control by the engine speed governor to beta control at particular power lever settings corresponding to for example, settings required in landing the aircraft. This requirement of pitch adjustment independent of engine output power setting under certain modes of aircraft operation and automatic conversion to simultaneous pitch and engine power adjustment from the engine power lever under various other modes of aircraft operation are requirements which necessarily complicate and contribute to the cost of the propeller pitch control system. Accordingly, such a pitch control system characterized by enhanced simplicity and optimal economy is sought.

DISCLOSURE OF INVENTION

It is therefore a principal object of the present invention to provide a pitch control system for a variable pitch propeller wherein propeller pitch and engine output power are independently controllable under certain modes of operation of the aircraft and automatically, simultaneously controlled from a single control input under various other modes of aircraft operation.

It is another object to provide such a pitch control system characterized by enhanced simplicity.

It is another object to provide such a pitch control system characterized by optimal economy.

It is another object to provide such a pitch control system which is readily adjustable and adaptable to various aircraft.

These and other objects which will become more apparent from the following detailed description taken in connection with the appended claims and accompanying drawing are achieved by the present invention wherein a pitch control system for a variable pitch propeller is provided with a pair of control means, one of the control means applying a speed signal to a propeller pitch actuator from a governor set by a condition lever, and under specified modes of operation, automatically blocking the governor speed signal from the actuator and connecting the actuator to a second control means connected to an engine power control lever whereby under such specified modes of operation, trimming of engine power effects an automatic desired adjustment in propeller blade pitch. In the preferred embodiment, the pitch actuator is an hydraulic actuator and the first and second control means comprise control valves. Under normal operating conditions such as in an aircraft cruise mode of operation, the governor, in response to adjustment thereof by the condition lever, sets a pilot valve which provides a fluid speed signal to the pitch actuator through the first control valve. The first control valve, including a movable valve element therein is operatively connected to the power lever in such a manner that upon reaching a predetermined position, the power lever positions the valve element so as to remove the speed signal from the actuator and replace that signal with a constant high amplitude signal for purposes of driving the actuator into operable connection with the second control valve. This control valve, also connected to the power lever effects partial draining of the actuator for the nulling thereof and mechanically connects the actuator with the power lever for direct adjustment in actuator position and hence propeller blade pitch independently of the engine speed governor in response to power lever setting. Both the control valves are pressurized internally thereof, biasing the connection of the valve elements with the power lever for maintaining power lever drag (resistance to movement thereof) at a level desirable from the standpoints of both safety and convenience. The system is provided with means by which the setting at which the power lever effects direct control of blade pitch and the rate of blade pitch change in such a mode are readily adjustable making the system readily adaptable for a wide range of airframes, engines, and propellers.

BRIEF DESCRIPTION OF DRAWING

The sole FIGURE is a schematic drawing of a pitch control system for a variable pitch propeller embodying the present invention.

BEST MODE FOR CARRYING OUT THE INVENTION AND INDUSTRIAL APPLICABILITY

Referring to the drawing, the present invention shown generally at 10 provides pitch control for a variable pitch propeller 20 which includes a hub 25 supporting blades, one of which is shown at 30, which is adjusted in pitch by pivotal movement about longitudinal axis 35 thereof in response to operation of pitch change actuator 40. Actuator 40 includes a cylinder 45 having a piston 50 which moves reciprocally therewithin. Piston 50 connects to cam 55 by connecting rods 65 and 70 and bearing pack (rotary to nonrotary interface) 80. Cam 55 includes a slot 83 therein within which roller 86 is received, the roller being mounted to trunion 88 extending radially inwardly from the root of blade 30. Those skilled in the art will recognize that reciprocation of actuator piston 50 effects a similar reciprocation of cam 55, engagement of the roller with slot 83 causing a rotation of the blade on bearings 90 about axis 35 to adjust blade pitch.

The description of the variable pitch propeller system given hereinabove forms no part of the present invention and is merely exemplary of a common type of variable pitch propeller system with which the invention hereof may be employed.

It will be understood by those skilled in the art that the magnitude of propeller blade pitch change effected by actuator 40 is determined by the admission of hydraulic fluid thereto and the draining of fluid therefrom. As shown in the drawing, metered fluid is admitted to the actuator through first conduit 95, such fluid pressurizing the piston for movement thereof to the left, in a direction providing a decrease in propeller blade pitch. Fluid at a constant supply pressure $P_S$ is provided to the actuator through second fluid conduit 100 this fluid pressurizing the piston for movement thereof to the right in a direction effecting an increase in blade pitch. As indicated in the drawing, the piston area pressurized by fluid from conduit 95 is substantially larger (on the order of twice) than the area of the piston pressurized by fluid in conduit 100. Accordingly, those skilled in the art will recognize piston 50 as a "half area piston" wherein the application through first fluid conduit 95 to the piston 50 of one-half the pressure $P_S$ (supply pressure) which is applied to the right-hand portion of the piston will balance the piston against movement thereof. It will be seen that adjustment of the pressure in first fluid conduit 95 upwardly or downwardly from $P_S/2$ adjusts the force on the left end of the piston upwardly or downwardly to achieve a desired piston displacement.

Piston 50 includes a generally L shaped bracket (arm) 105 extending outwardly and upwardly from the piston, bracket 105 including an adjustable abutment 110 threaded into the end thereof. In a manner to be described in further detail hereinafter, abutment 110 actuates a control means in system 10 to convert the system from pitch control in response to the engine speed governor (condition lever) to pitch control in response to settings of the power lever.

Hydraulic fluid is supplied to first fluid conduit 95 from branch conduit 115 which communicates with first control valve (first control means) 120 at a housing 125 thereof. Housing 125 includes first and second inlets 130 and 135 and outlets 140 and 142. Inlet 130 provides valve 120 with metered fluid which is subsequently fed to the actuator via lines 115 and 95. Inlet 135 provides valve 120 with fluid at supply pressure $P_S$ which replaces the metered fluid in lines 95 and 115 when the system operates in a beta control mode. As readily seen, outlet 140 communicates with conduit 115 for provision of hydraulic fluid to the actuator. Outlet 142 communicates with drain pressure, which, in the case where the system is disposed in a reservoir of hydraulic fluid, will comprise ambient pressure. Outlet 140 is provided with windows 145 and 150 which provide communication between that outlet and the interior of the valve housing. First control valve 120 also includes a reciprocally movable valve element 155 within the housing. Valve element 155 is provided with three generally annular recesses 160, 165 and 170 in the surface thereof, recess 160 connecting to an internal passage 175 which provides fluid communication between recess 160 and the end of valve element 155. Recess 160 also provides communication between inlet 135 and outlet 140 through window 145 for replacing the metered pressure provided to the actuator with supply pressure under a beta mode of control. Recess 165 provides communication between inlet 130 and outlet 140 while leakage along the valve element is collected in recess 170 for drain from outlet 142. The valve element may be provided with a screw or similar adjustable means 180 at the left-hand end thereof for adjustable engagement with roller 185 provided on the upper end of crank arm 190. Arm 190 is pivotally grounded 195 and provided with another roller 200 at a medial portion thereof.

Fluid is drained from first fluid conduit 95 and hence the left-side of actuator piston 50 by a second control means (second control valve) 210 which includes a housing 215 provided with inlets 220 and 225 thereto. Second control valve 210 also includes a first and second means 230 and 235 for draining the first fluid conduit 95 for limiting the displacement of the actuator in a decreasing pitch direction, first draining means 230 comprising a hollow sleeve reciprocally movable within the housing and including a passage (window) 240 registrable with inlet 220. The flow area of window 240 is substantially larger than that of window 145 in first control valve housing. Pressures interiorly (at the end of second draining means 235) and exteriorly of sleeve 230 are equalized by communication between those areas via radial passage 250 adjacent land 245. Sleeve 230 also includes a pintle 255 extending across the hollow interior of the sleeve generally normal to the sleeve's longitudinal axis.

Second draining means 235 comprises a valve element received reciprocally within sleeve 230, this valve element including a straight, elongate slot 260 therein in which pintle 255 is received. Those skilled in the art will appreciate that slot 260 and pintle 255 comprise a lost motion connection whereby sleeve 230 may reciprocate within housing 215 without causing movement of valve element 235 unless pintle 255 is engaged with one of the ends of slot 260. Valve element 235 also includes a recess 265 in the surface thereof, which, as will be explained more fully hereinafter, is registrable with window 240 in sleeve 230 and inlet 220 in housing 215. A screw or similar adjustable member 270 is threaded into the end of valve element 235 and engages roller 275 mounted on the upper end of crank arm 280 pivotally grounded at 285 and including a roller 290 mounted at the lower end thereof.

Rollers 200 and 290 engage a cam 295 fixed to a shaft 300 which pivots about its longitudinal axis in response to activation of a power lever 305 operated by the pilot from the cockpit of the airplane.

Supply pressure is also provided to the system through conduit 310 which connects with inlet 225 of second control valve 210. Conduit 310 includes an orifice or flow restrictor 315 therein which lowers the pressure of the fluid. Supply pressure is also provided to the system through conduit 320 which feeds hydraulic fluid to a pilot valve 325 mechanically connected to a speed governor such as a state-of-the-art centrifugal governor 330 set by the pilot's condition lever 335 mechanically connected thereto as indicated by dotted line 340. As is well known in the art, adjustment of condition lever 335 adjusts the setting of governor 330 (spring loading the centrifugal weights therein). Governor 330 in turn adjusts pilot valve 325 thereby adjusting the drop in pressure in line 320 from $P_S$ to a metered pressure provided to the system through line 345 which connects with inlet 130 of the first control valve. The operation of the condition lever, the governor and pilot valve, to achieve a metered pressure, is well known in the art and forms no part of the invention herein. For a description of a suitable governor-pilot valve subsystem, reference is made to U.S. Pat. No. 3,068,943 to Fischer.

This metered pressure is applied to the left side of pitch actuator piston 50 through the first control valve, branch conduit 115 and first fluid conduit 95. If the metered pressure is less than one-half $P_S$, the net pressurization of piston 50 will be in the right-hand direction, moving the piston and propeller blades in an increasing pitch direction. Similarly, if the metered pressure is greater than one-half $P_S$, the net pressurization of piston 50 will be in the left-hand direction driving the piston and blades 30 in a decreasing pitch direction. When the blade pitch reaches the desired valve, the resulting engine speed will correspond to the setting of the governor (the centrifugal loading of the governor weights balance the spring loading thereof) and the governor will set the pilot valve to a neutral position, maintaining the fluid pressure in first fluid conduit 95 at $P_S/2$ to hold the pitch change actuator piston 50 and the blades 35 at the desired setting.

As set forth hereinabove, one of the objectives of the invention herein is to provide a means for automatically switching from condition lever control of blade pitch to direct power lever (beta) control thereof independently of the governor. When the power lever is adjusted to a setting corresponding to the desired transition from control by the governor to direct control by the power lever, cam 295 urges crank arm 190 clockwise about mount 195 moving valve element 155 from the position illustrated to the right by virtue of the engagement of this member with roller 185. This places annular recess 160 in registry with bath inlet 135 and window 145 in outlet 140, and annular recess 165 in registry with both inlet 130 and outlet 142 thereby draining the metered pressure speed signal through outlet 142 and in effect, blocking this signal from the actuator piston, replacing the signal with an independent high amplitude fluid signal (at supply pressure) $P_S$.

With such movement of valve element 155″, fluid at supply pressure $P_S$ now flows through inlet 135, annular recess 160, outlet 140 and lines 115 and 95 to the left side of actuator piston 50. This pressurizes both ends of the piston with fluid at supply pressure. Due to the pressurized piston area at the left end thereof being more extensive than that at the right end, such pressurization causes the piston to move to the left in a decreasing pitch direction. Accordingly, bracket 105 and abutment 110 also move in a decreasing pitch direction, abutment 110 eventually engaging sleeve 230 of second control valve 210 moving that sleeve to the left. Referring to that portion of the drawing depicting the second control valve, movement of sleeve 230 to the left places window 240 in communication with both inlet 220 and recess 265 in valve element 235. Such communication causes fluid at supply pressure fed through line 115 to drain out the upper portion of first conduit 95 and inlet 220, window 240 and recess 265 to ambient (drain). Inasmuch as window 240 is substantially larger than window 145, supply fluid will drain through second control valve 210 more quickly than supply fluid will be provided to the actuator piston. Therefore, eventually, the pressure on the left side of piston 50 will fall below one-half supply pressure $P_S$ and the piston and bracket 105 and abutment 110 will begin to move to the right due to the pressurization thereof through line 100. Pressurization of the interior of sleeve 230 of the second control valve causes the sleeve to follow abutment 110 thereby decreasing the registry of window 240 with inlet 220 and recess 265 in valve element 235 to reduce the draining of the left side of the actuator piston to a rate below that at which the actuator piston is pressurized by flow through the first control valve. Accordingly, the left side of the piston will again begin to pressurize with fluid at supply pressure and will begin to move back in a decreasing pitch direction, opening the registry of window 240 with outlet 220 and recess 265 to again increase the draining. Accordingly, it will be seen that as long as the power lever remains in a position corresponding to desired direct (beta) propeller pitch control, the actuator piston will cycle infinitesimally in increasing and decreasing pitch directions while window 240 remains in registry with recess 265 and inlet 220.

It will be seen that the connection of window 240 with inlet 220 and recess 265 defines a fluid coupling of sleeve 230 with valve element 235. Thus, when valve element 235 is moved by adjustment of the power lever 305 and the resulting movement of cam 295 and crank arm 280, the flow of fluid between element 235 and 230 will cause sleeve 230 to follow element 235. Therefore, for any setting of power lever 305 within a range of engine powers below that at which the transition from governor control to beta control occurs, movement of valve element 235 to the right will cause a corresponding rightward movement of sleeve 230, abutment 110, bracket 105 and therefore piston 50. Pressurization of the interior of sleeve 230 at the end of valve element 235 through line 315 and radial passage 250 causes valve elements 230 and 235 to follow any counterclockwise movement of the upper end of crank arm 280. Pressurization of the left end of piston 50 urges the piston to the left thereby following such counterclockwise movement of the crank arm.

Accordingly, it will be appreciated that the pitch control system of the present invention provides an effective means for transitioning from governor pitch control to beta (power lever) pitch control at predetermined engine power levels. The system also provides an effective means for directly controlling pitch actuator movement with the engine power lever independently of the engine governor at all engine powers below a predetermined transition power level. The provision of replaceable cam 295, adjustable screws 180 and 270 and adjustable abutment 110 allows the characteristics of the system to be readily tailored to various propeller, engines and airframes, merely by replacement or adjustment of these members. The pressurization of the valve elements against the power lever cam allows the drag on the power lever to be maintained at a desired value and further allows the power lever and blade pitch to assume (to motor to) predetermined settings in the event that the lever is accidently released by the pilot.

While the present invention has been described with respect to a particular embodiment thereof it will be understood that various modifications may suggest themselves to those skilled in the art and it is intended by the following claims to cover such modifications as fall within the true spirit and scope of this invention.

Having thus described the invention what is claimed is:

1. A pitch control system for a variable pitch propeller powered by an engine the output power of which is adjusted by a power lever, said pitch control system including an hydraulic actuator connected to the blades of said propeller for movement thereof in a pitch change direction, a propeller speed governor operating a pilot valve which provides an hydraulic signal indicative of desired propeller speed at engine power greater than a select power, said pitch control system being characterized by:

a first control valve set by said power lever for selectively applying said hydraulic speed signal to said actuator, said actuator adjusting the pitch of said blades in response to said hydraulic speed signal;

said first control valve including means for selectively blocking said speed signal from said actuator in response to a predetermined setting of said engine power lever corresponding to said select engine power setting; and a second control valve, said second control valve, at a range of settings of said engine power lever corresponding to engine output powers of lesser magnitude than said select power, being hydraulically biased into operative connection between said engine power lever and said actuator for setting said actuator to control the pitch of said propeller blades by adjustment of said engine power lever at said range of settings thereof independently of the operation of said governor and said pilot valve.

2. The pitch control system of claim 1 characterized by:

a constant amplitude hydraulic signal independent of said speed signal being applied to said pitch control system, said means for selectively blocking said hydraulic speed signal from said actuator including means for effecting a replacement of said hydraulic speed signal at said first control valve with said constant amplitude hydraulic signal for moving said actuator in a decreasing pitch direction to connect said actuator with said second control valve.

3. The pitch control system of claims 1 or 2 characterized by said actuator comprising an hydraulic speed signal comprising a first fluid pressure and said constant amplitude signal comprising a second fluid pressure.

4. The pitch control system of claim 3 characterized by said first fluid pressure comprising a metered pressure set by the operation of said governor and pilot valve and said second fluid pressure comprising a constant, unmetered supply pressure.

5. The pitch control system of claim 3 characterized by said first pressure being applied to a first inlet of said first control valve and said second fluid pressure being applied to both a second inlet of said first control valve and a first surface of said actuator thereby urging said actuator in a direction corresponding to increasing blade pitch; said first control valve communicating with said actuator through a first fluid conduit; said means for selectively blocking said speed signal from said actuator comprising a valve element of said first control valve actuatable by said engine power lever and provided with passages therein which connect said first inlet with said first fluid conduit under normal operating conditions and said second inlet with said first fluid conduit at said range of settings of said engine power lever for effecting a net displacement of said actuator in a direction corresponding to decreasing blade pitch and connection of said actuator to said second control valve.

6. The pitch control system of claim 5 characterized by said second control valve at an inlet thereof communicating with said first fluid conduit and including first and second means registrable with said inlet for draining said first fluid conduit for limiting displacement of said actuator in said decreasing pitch direction, said first and second draining means being positionable by said actuator and said engine power lever respectively to effect said draining of said first fluid conduit to limit said displacement of said actuator in said decreasing pitch direction.

7. The pitch control system of claim 6 characterized by said second control valve including a housing, said second control valve inlet being disposed in said housing said first draining means comprising a hollow sleeve reciprocative within said housing and including a passage therethrough registrable with said second control valve inlet, said second draining means comprising a control valve element reciprocative within said hollow sleeve and including a passage therein maintained in select registry with said passage in said sleeve and select registry with drain by said engine power lever.

8. The pitch control system of claim 5 characterized by said valve element of said first control valve at one end thereof being operatively connected to said engine power lever and at an opposite end thereof being pressurized for application of a controlled reaction force to said engine power lever.

9. The pitch control system of claim 7 characterized by said valve element of said second control valve at one end thereof being operatively connected to said engine power lever and at an opposite end thereof being pressurized for application of a controlled reaction force to said engine power lever.

10. The pitch control system of claim 1 characterized by said actuator including means for connecting said actuator to said second control valve, said connecting means being adjustable in position with respect to said actuator for selectively varying said range of settings of said engine power lever at which said actuator is operatively connected to said second control valve.

11. The pitch control system of claim 10 characterized by said actuator comprising a fluid actuator, said second control valve including a housing and a movable valve element disposed within said housing in communication with said actuator for controlling the supply of hydraulic fluid thereto thereby controlling the position of said actuator at which said actuator operatively connects to said control valve, said means for connecting said actuator to said second control valve comprising an adjustable abutment mounted on a movable portion of said actuator and engageable with said second control valve at said valve element thereof.

12. The pitch control system of claim 3 characterized by said engine power lever being connected to a movable member having a replaceable cam fixed thereto and movable therewith, said first and second control valves including movable valve elements connected to said cam by way of first and second followers respectively, whereby the response of said first and second control valve elements to movement of said movable member by said engine power lever is variable by substitution of another, for said cam.

* * * * *

UNITED STATES PATENT AND TRADEMARK OFFICE
CERTIFICATE OF CORRECTION

PATENT NO. : 4,533,295

DATED : August 6, 1985

INVENTOR(S) : Jerome G. Duchesneau

It is certified that error appears in the above-identified patent and that said Letters Patent is hereby corrected as shown below:

Page 1, under the section entitled "Inventor" please add the following inventor -- Robert A. Schwartz, Vernon, Conn.--.

Column 5, line 35, "bath" should be --both--.

Column 7, Claim 3, line 3, after "amplitude" insert --hydraulic--.

Signed and Sealed this

Seventeenth Day of December 1985

[SEAL]

Attest:

DONALD J. QUIGG

Attesting Officer  Commissioner of Patents and Trademarks